(12) United States Patent
Jamal et al.

(10) Patent No.: US 10,283,795 B2
(45) Date of Patent: *May 7, 2019

(54) METHOD AND SYSTEM FOR COMBINED HYDROGEN AND ELECTRICITY PRODUCTION USING PETROLEUM FUELS

(71) Applicant: Saudi Arabian Oil Company, Dhahran (SA)

(72) Inventors: Aqil Jamal, Dhahran (SA); Thang Pham, Dhahran (SA)

(73) Assignee: SAUDI ARABIAN OIL COMPANY, Dhahran (SA)

(*) Notice: Subject to any disclaimer, the term of this patent is extended or adjusted under 35 U.S.C. 154(b) by 0 days.

This patent is subject to a terminal disclaimer.

(21) Appl. No.: 15/977,061

(22) Filed: May 11, 2018

(65) Prior Publication Data

US 2018/0261861 A1    Sep. 13, 2018

Related U.S. Application Data

(60) Continuation of application No. 14/730,034, filed on Jun. 3, 2015, now Pat. No. 10,008,730, which is a
(Continued)

(51) Int. Cl.
*H01M 8/0612* (2016.01)
*H01M 8/0662* (2016.01)
(Continued)

(52) U.S. Cl.
CPC ....... *H01M 8/0618* (2013.01); *B60L 11/1883* (2013.01); *B65B 1/00* (2013.01); *C01B 3/382* (2013.01); *C01B 3/384* (2013.01); *C01B 3/48* (2013.01); *C01B 3/56* (2013.01); *F17C 5/06* (2013.01); *H01M 8/04201* (2013.01); *H01M 8/0637* (2013.01); *H01M 8/0656* (2013.01);
(Continued)

(58) Field of Classification Search
CPC ............ H01M 8/0618; H01M 8/1231; H01M 8/0656; H01M 8/0637; H01M 8/04201; H01M 2008/1293
See application file for complete search history.

(56) References Cited

U.S. PATENT DOCUMENTS 5,346,778 A    9/1994 Ewan
6,802,875 B1   10/2004 Kimbara
(Continued)

FOREIGN PATENT DOCUMENTS

CA    2855780      5/2013
CN    103999277    8/2014
(Continued)

OTHER PUBLICATIONS

Timmerman, et al., "Kinetics of (reversible) Internal Reforming of Methane in Solid Oxide Fuel Cells Under Stationary and APU Conditions," Abstract, Journal of Power Sources, Jan. 2010.
(Continued)

*Primary Examiner* — Timothy L Maust
*Assistant Examiner* — Timothy P. Kelly
(74) *Attorney, Agent, or Firm* — Bracewell LLP; Constance G. Rhebergen; Kevin R. Tamm

(57) ABSTRACT

A solid oxide fuel cell (SOFC) system including a steam reformer, a hydrogen purification system, a pre-reformer, and a solid oxide fuel cell.

22 Claims, 1 Drawing Sheet

Related U.S. Application Data division of application No. 13/683,272, filed on Nov. 21, 2012, now Pat. No. 9,365,131.

(60) Provisional application No. 61/562,189, filed on Nov. 21, 2011.

(51) Int. Cl.

| | |
|---|---|
| *B65B 1/00* | (2006.01) |
| *C01B 3/38* | (2006.01) |
| *C01B 3/48* | (2006.01) |
| *C01B 3/56* | (2006.01) |
| *B60L 11/18* | (2006.01) |
| *F17C 5/06* | (2006.01) |
| *H01M 8/12* | (2016.01) |
| *H01M 8/1231* | (2016.01) |
| *H01M 8/04082* | (2016.01) |
| *H01M 8/0637* | (2016.01) |
| *H01M 8/0656* | (2016.01) |
| *H01M 8/0668* | (2016.01) |
| *H01M 8/124* | (2016.01) |
| *H01M 8/04089* | (2016.01) |

(52) U.S. Cl.
CPC ........... *H01M 8/0662* (2013.01); *H01M 8/12* (2013.01); *H01M 8/1231* (2016.02); *C01B 2203/0233* (2013.01); *C01B 2203/0283* (2013.01); *C01B 2203/043* (2013.01); *C01B 2203/0455* (2013.01); *C01B 2203/0485* (2013.01); *C01B 2203/066* (2013.01); *C01B 2203/0811* (2013.01); *C01B 2203/1258* (2013.01); *C01B 2203/1288* (2013.01); *C01B 2203/141* (2013.01); *C01B 2203/148* (2013.01); *H01M 8/04097* (2013.01); *H01M 8/0668* (2013.01); *H01M 8/0675* (2013.01); *H01M 2008/1293* (2013.01); *H01M 2250/10* (2013.01); *H01M 2250/20* (2013.01); *H01M 2300/0074* (2013.01); *Y02B 90/14* (2013.01); *Y02E 60/321* (2013.01); *Y02E 60/50* (2013.01); *Y02E 60/525* (2013.01); *Y02P 30/30* (2015.11); *Y02T 90/32* (2013.01); *Y02T 90/34* (2013.01)

(56) References Cited

U.S. PATENT DOCUMENTS

| | | |
|---|---|---|
| 6,841,279 B1 | 1/2005 | Foger |
| 6,972,119 B2 | 12/2005 | Taguchi |
| 7,097,925 B2 | 8/2006 | Keefer |
| 7,326,329 B2 | 2/2008 | Gomez |
| 7,399,328 B2 | 7/2008 | Ukai |
| 7,875,402 B2 | 1/2011 | Hershkowitz |
| 7,883,803 B2 | 2/2011 | McElroy |
| 9,365,131 B2 | 6/2016 | Jamal et al. |
| 2003/0143448 A1 | 7/2003 | Keefer |
| 2004/0031388 A1 | 2/2004 | Hsu |
| 2004/0131901 A1 | 7/2004 | Yamashita et al. |
| 2004/0234827 A1 | 11/2004 | Fujihara |
| 2009/0155649 A1 | 6/2009 | Cui |
| 2009/0155650 A1 | 6/2009 | Cui |
| 2013/0126038 A1 | 5/2013 | Jamal |
| 2015/0266393 A1 | 9/2015 | Jamal et al. |

FOREIGN PATENT DOCUMENTS

| | | |
|---|---|---|
| EP | 1767845 A1 | 3/2007 |
| EP | 2783413 | 10/2014 |
| JP | 2006221850 A | 8/2006 |
| JP | 2007016976 A | 1/2007 |
| JP | 2009155190 A | 7/2009 |
| JP | 2015507813 A | 3/2015 |
| KR | 20140098158 | 8/2014 |
| WO | 2013078142 A2 | 5/2013 |

OTHER PUBLICATIONS

PCT Search Report and Written Opinion for Related PCT Application PCT/US2012/065907, dated Dec. 20, 2013.
Singapore Search Report and Written Opinion for Related Singapore Application No. 11201402220U, dated Jan. 5 2015.

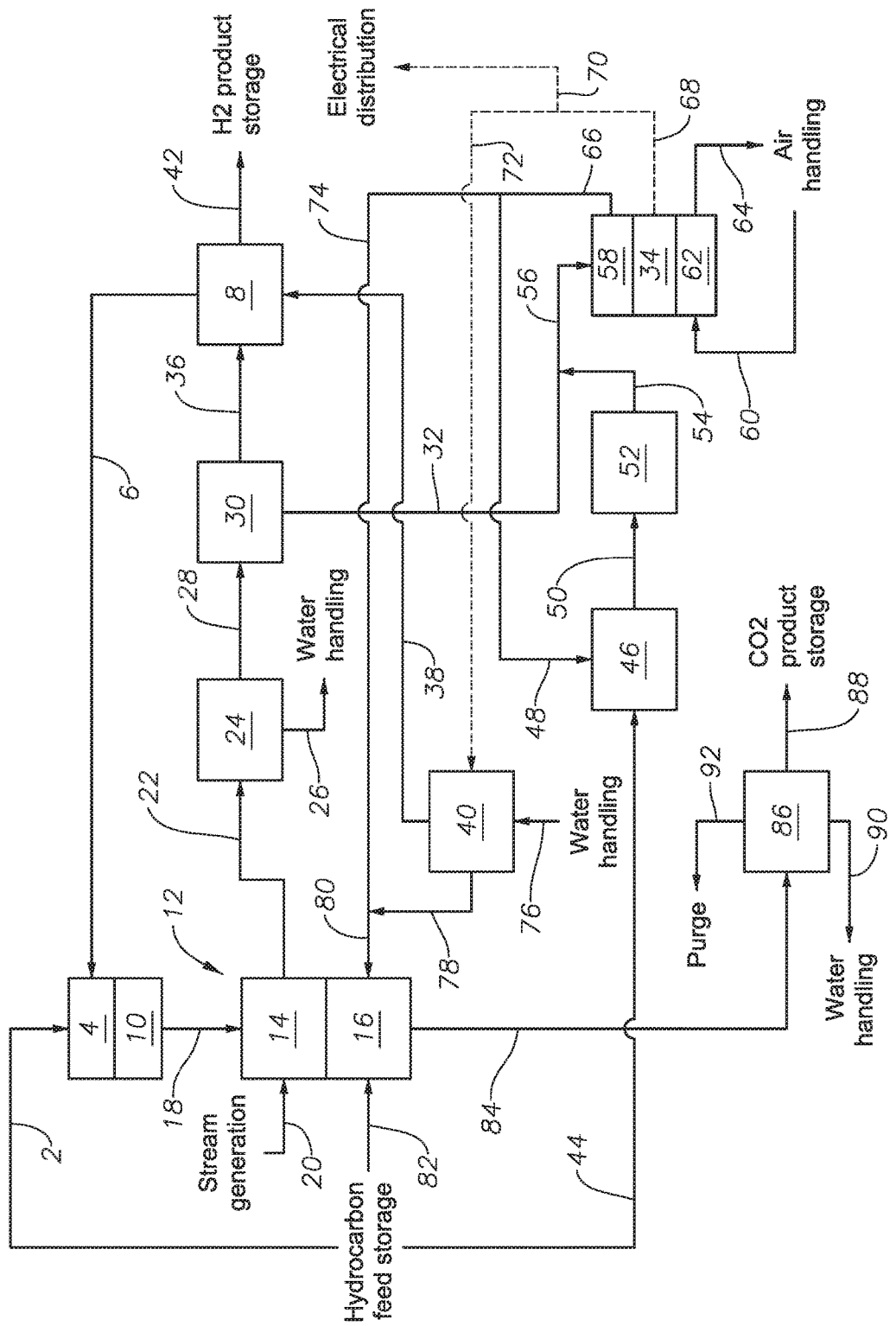

METHOD AND SYSTEM FOR COMBINED HYDROGEN AND ELECTRICITY PRODUCTION USING PETROLEUM FUELS

CROSS-REFERENCE TO RELATED PATENT APPLICATIONS

This application is a continuation application of U.S. patent application Ser. No. 14/730,034, filed Jun. 3, 2015, which itself is a divisional application of non-provisional U.S. patent application Ser. No. 13/683,272, filed Nov. 21, 2012, and now issued as U.S. Pat. No. 9,365,131, which itself claims priority from U.S. Provisional Pat. App. No. 61/562,189, filed Nov. 21, 2011. For purposes of United States patent practice, this application incorporates the contents of the parent non-provisional applications and the provisional application by reference in their entirety.

BACKGROUND

1. Field

The field of invention relates to a solid oxide fuel cell (SOFC) process and system. More specifically, the field relates to using a SOFC process and system using a liquid hydrocarbon for producing electricity, hydrogen and carbon dioxide simultaneously.

2. Description of the Related Art

Liquid petroleum fractions such as naphtha, kerosene and diesel are highly portable, widely available and can be stored at atmospheric conditions with little difficulty.

Global interest in the commercial use of non-gasoline and non-diesel powered vehicles is accelerating. Material and design research today focus on both hydrogen fuel cell vehicles (HFCVs) and electrically powered vehicles (EVs). A commonly asked question is how and where are these vehicles fueled? Currently, hydrogen gas transport is very expensive on a BTU (British Thermal Unit) basis. The electrical infrastructure and transmission lines of most countries will require significant expansion and upgrade to handle the electrical demand from mobile users.

Power generation and chemical processing facilities create three major products: the primary product (chemicals/electricity), steam/heat, and carbon dioxide. Electricity/chemicals and steam/heat (generated as part of the process of heating and cooling electricity-producing processes) are useful and convertible into other forms for export, transmission or local usage. Carbon dioxide (and other noxious gases such as carbon monoxide) until recently was released into the atmosphere as a waste product. With more stringent greenhouse gas monitoring and reporting requirements as well as alternative uses such as chemical production and enhanced oil recovery (EOR), it is in the generation facility's interest to not only reduce the amount of carbon dioxide produced but to capture as much as possible for use.

Purified carbon dioxide is operable to extract up to an additional 1.89 barrels of crude oil per ton injected into a hydrocarbon-bearing formation as part of an enhanced oil recovery operation.

A system that not only produces electricity and hydrogen for local use as a source of portable power for vehicles but also captures carbon dioxide for either sequestration or use in downstream or downhole processes is desirable.

SUMMARY

A method of using a SOFC system produces a refined carbon dioxide product, electrical power, and a compressed hydrogen product. The method includes the steps of introducing a hydrocarbon fuel and steam to the SOFC system. The method includes the step of operating the SOFC system such that an amount of anode exhaust recycle passes into the pre-reformer such that the steam-to-carbon molar ratio in the pre-reformer is in a range of from about 3:1 to about 4:1, an amount of oxygen passes into the reformer combustion chamber in excess of the stoichiometric amount required to fully combust all of the hydrocarbons and hydrogen present in the reformer combustion chamber, the SOFC system produces a refined carbon dioxide product, electrical power, and a compressed hydrogen product, and that greater than 90% of the carbon dioxide produced within the SOFC system is converted into the refined carbon dioxide product.

The SOFC system for producing a refined carbon dioxide product, electrical power suitable for electrically powered vehicles and compressed hydrogen product suitable for hydrogen fuel cell vehicles uses steam and a hydrocarbon fuel. The SOFC system includes a hydrodesulfurization system, a steam reformer having catalytic reactor tubes and a reformer combustion chamber, a water-gas shift reactor system, a hydrogen purification system, a hydrogen compression and storage system, a pre-reformer, a solid oxide fuel cell, an oxygen generation system, and a $CO_2$ purification and liquidification system. In an embodiment of the SOFC system, the oxygen generation system of the SOFC system electrically couples to the solid oxide fuel cell and produces both hydrogen and oxygen.

An alternative fueling station useful for fueling both electrical and hydrogen alternative fuel vehicles includes the SOFC system. The alternative fueling station also includes an electrical conduit that couples to the solid oxide fuel cell of the SOFC system and is operable to convey electrical current produced by the SOFC system to an electrical alternative fuel vehicle. The alternative fueling station also includes a compressed hydrogen conduit that couples to the hydrogen compression and storage system of the SOFC system and is operable to convey compressed hydrogen having a pressure in a range of from about 350 bars to about 700 bars and having a hydrogen mole purity of 99.99 percent to the hydrogen alternative fuel vehicle.

A method of using an alternative fueling station to fuel an alternative fuel vehicle uses the station with the SOFC as previously described. The alternative fuel vehicle has an alternative fuel storage device. The method of using the alternative fueling station includes the steps of introducing steam and a hydrocarbon fuel to the alternative fueling station and operating the alternative fueling station to produce the alternative fuel. The method includes the step of coupling the alternative fuel vehicle to the alternative fueling station such that a conduit forms between the SOFC system of the alternative fueling station and the alternative fuel storage device. The method includes the step of introducing an amount of alternative fuel to the alternative fuel vehicle such that the amount does not exceed the capacity of the alternative fuel storage device. The method includes the step of decoupling the alternative fuel vehicle from the alternative fueling station.

The solid oxide fuel cell (SOFC) system and method of use produces a highly refined, compressed hydrogen product that is useful for systems sensitive to hydrogen purity, including the fuel cells of hydrogen-powered vehicles. The SOFC system and process also generates "surplus" electrical power. Electrical power, especially direct current electrical power, is useful for charging mobile battery storage systems and exporting energy to an electrical power grid. Those of ordinary skill in the art understand that "surplus" means an amount beyond what is necessary to support the operation of the SOFC system during use, including the electrochemical reaction in the solid oxide fuel cell. The method of using the SOFC system produces a highly refined, compressed liquid carbon dioxide product useful for chemical manufacturing processes, enhanced oil recovery and other applications.

The SOFC system uses hydrocarbon fuels both as an energy source and as a source of reactants. The SOFC system generating both hydrogen and electrical power proximate to a retail refueling location for HFCVs and EVs reduces the transportation infrastructure requirements and costs for moving both these products to the fueling stations. Capturing carbon dioxide and forming a high quality, compressed and chilled CO2 product permits spot marketing near potential commercial end-users or ease of transport to remote locations for sequestration or use. Importantly, it also prevents carbon dioxide emissions to the environment.

To permit the use of different types of hydrocarbon fuels, the SOFC system includes both a steam reformer and a pre-reformer. The steam reformer operates to manufacture hydrogen from the steam-driven catalytic conversion of the hydrocarbon-bearing material. The pre-reformer converts both new and recycled streams into methane to maximize the internal reforming capacity of the solid oxide fuel cell, which lowers its overall utility requirements and improves operational efficiency, for converting fuel into electricity.

The inclusion of a pre-reformer in the SOFC system provides several operational benefits. Non-methane alkanes are more responsive to reformation into methane than methane is to converting into syngas components. Converting non-methane alkanes into methane stabilizes the feed composition of the solid oxide fuel cell. In turn, compositional feed stability results in stabilization of operations of the solid oxide fuel cell, resulting in steady electrical and anode off-gas production. Maximizing the methane in the feed composition promotes internal reformation, which cools the interior of the fuel cell. The solid oxide fuel cell generates a significant amount of heat during conversion. Relying on the internal reforming process to support the cooling of the interior of the solid oxide fuel cell instead of providing exterior cooling systems saves energy and reduces the footprint—both in energy use and size—of the system.

The inclusion of an oxygen generation system ensures that the flue gas created in the "oxy combustor" is essentially pure carbon dioxide. This reduces the amount of carbon dioxide and inerts needed for purging from the system. The electrolysis cell provides pure oxygen in stoichiometric excess to the carbon present in the reformer combustion chamber feeds. This ensures that nothing other than carbon dioxide forms from the combustion.

BRIEF DESCRIPTION OF THE DRAWINGS

These and other features, aspects, and advantages of the present disclosure are better understood with regard to the following Detailed Description of the Preferred Embodiments, appended Claims, and accompanying FIGURES, where:

FIG. 1 is a process flow diagram of an embodiment of a SOFC system.

DETAILED DESCRIPTION OF THE PREFERRED EMBODIMENTS

The Specification, which includes the Summary, Brief Description of the Drawings and the Detailed Description of the Preferred Embodiments, and the appended Claims refer to particular features (including process or method steps) of the disclosure. Those of skill in the art understand that the invention includes all possible combinations and uses of particular features described in the Specification. Those of skill in the art understand that the disclosure is not limited to or by the description of embodiments given in the Specification. The inventive subject matter is not restricted except only in the spirit of the Specification and appended Claims.

Those of skill in the art also understand that the terminology used for describing particular embodiments does not limit the scope or breadth of the disclosure. In interpreting the Specification and appended Claims, all terms should be interpreted in the broadest possible manner consistent with the context of each term. All technical and scientific terms used in the Specification and appended Claims have the same meaning as commonly understood by one of ordinary skill in the art to which this invention belongs unless defined otherwise.

As used in the Specification and appended Claims, the singular forms "a", "an", and "the" include plural references unless the context clearly indicates otherwise. The verb "comprises" and its conjugated forms should be interpreted as referring to elements, components or steps in a non-exclusive manner. The referenced elements, components or steps may be present, utilized or combined with other elements, components or steps not expressly referenced. The verb "couple" and its conjugated forms means to complete any type of required junction, including electrical, mechanical or fluid, to form a singular object from two or more previously non-joined objects. If a first device couples to a second device, the connection can occur either directly or through a common connector. "Optionally" and its various forms means that the subsequently described event or circumstance may or may not occur. The description includes instances where the event or circumstance occurs and instances where it does not occur.

Spatial terms describe the relative position of an object or a group of objects relative to another object or group of objects. The spatial relationships apply along vertical and horizontal axes. Orientation and relational words including "upstream" and "downstream" and other like terms are for descriptive convenience and are not limiting unless otherwise indicated.

Where a range of values is provided in the Specification or in the appended Claims, it is understood that the interval encompasses each intervening value between the upper limit and the lower limit as well as the upper limit and the lower limit. The invention encompasses and bounds smaller ranges of the interval subject to any specific exclusion provided.

Where reference is made in the Specification and appended Claims to a method comprising two or more defined steps, the defined steps can be carried out in any order or simultaneously except where the context excludes that possibility.

All pressure values are understood to be gauge pressure.

FIG. 1

FIG. 1 shows a process flow diagram of an embodiment of a SOFC system. The SOFC system is operable to generate electrical power, liquefied carbon dioxide product suitable for EOR, and hydrogen suitable for use in HFCVs from a hydrocarbon feed. FIG. 1 is a simple diagram for ease of description. Those of ordinary skill in the art understand that such systems are complex structures with ancillary equipment and subsystems that render them operable for their intended purpose.

SOFC system 100 uses vaporized liquid hydrocarbons from a source outside of the system to provide hydrocarbons for manufacture of refined hydrogen. Hydrocarbon feed conduit 2 introduces vaporized liquid hydrocarbons into SOFC system 100 for conversion into hydrogen suitable for HFCVs and EOR-quality carbon dioxide. Hydrocarbon feed conduit 2 couples to a liquid hydrocarbon feed storage facility that is outside of SOFC system 100.

Hydrocarbon feed conduit 2 couples to the process inlet of hydrotreater 4 and introduces a portion of the vaporized liquid hydrocarbon into hydrotreater 4. Hydrotreater 4 is operable to convert organic sulfur compounds into hydrogen sulfides and alkanes using hydrogen over a hydrotreating catalyst, producing a hydrotreated gas. Hydrogen recycle feed conduit 6, which couples hydrotreater 4 to H2 compression train 8, introduces a portion of compressed hydrogen into hydrotreater 4 to supply the hydrogen for hydrotreatment. The hydrotreated gas passes from hydrotreater 4 into sorbent bed 10. Sorbent bed 10 absorbs the hydrogen sulfide from the hydrotreated gas using a metal oxide absorbent and forms desulfurized hydrocarbon gas as a product.

Although shown stacked on top of one another in FIG. 1 for artistic convenience, those in the art understand that steam reformer 12 actually has catalytic reactor tubes 14 containing reformation catalyst passing through combustion chamber 16. Reformer feed conduit 18 couples sorbent bed 10 to the process inlet of catalytic reactor tubes 14 and introduces the desulfurized hydrocarbon gas into steam reformer 12. Steam reformer 12 is operable to convert the alkanes in the desulfurized hydrocarbon gas into a reformer syngas with steam in the presence of the reformation catalyst. The reformer syngas predominantly is made of hydrogen, carbon oxides and water. Trace amounts of methane and inerts may also be present. Superheated steam conduit 20 couples to and introduces superheated steam from a steam generation system outside of SOFC system 100 into catalytic reactor tubes 14. Steam reformer 12 receives heat transferred from combustion chamber 16, which is the main thermal driver for the reformation process occurring in catalytic reactor tubes 14.

Reformer product conduit 22 couples catalytic reactor tubes 14 of steam reformer 12 to the process inlet of water-gas shift reactor system 24 and introduces the reformer syngas into water-gas shift reactor system 24. Water-gas shift reactor system 24 is operable to convert carbon monoxide and water in the reformer syngas into carbon dioxide and hydrogen, forming a shifted syngas. Water condensate conduit 26 couples to water-gas shift reactor system 24 through a liquid outlet and passes condensed water to a water handling facility outside of SOFC system 100.

Water-reactor product conduit 28 couples water-gas shift reactor system 24 to hydrogen pressure-swing absorber (PSA) 30 and introduces the shifted syngas to hydrogen PSA 30. Hydrogen PSA 30 is operable to extract hydrogen from the shifted syngas, forming a low-pressure off-gas and refined hydrogen gas. PSA off-gas conduit 32 couples to solid oxide fuel cell 34 and directs the low-pressure off-gas, which includes methane, carbon oxides, inerts and some hydrogen to solid oxide fuel cell 34.

Product hydrogen conduit 36 couples hydrogen PSA 30 to hydrogen compression train 8 and introduces the refined hydrogen gas into hydrogen compression train 8. Electrolysis hydrogen conduit 38 couples electrolysis cell 40 to hydrogen compression train 8 and introduces electrolysis hydrogen into hydrogen compression train 8. Hydrogen compression train 8 pressurizes both the refined hydrogen gas and electrolysis hydrogen into a compressed hydrogen product suitable for transport and use in HFCVs. Compressed hydrogen product conduit 42 directs the compressed hydrogen not used for recycle to hydrotreater 4 into a compressed hydrogen product storage facility outside of SOFC system 100.

SOFC system 100 uses vaporized liquid hydrocarbons from a source outside of the system to provide hydrocarbons for manufacture of refined hydrogen, carbon dioxide suitable for EOR and electricity. Hydrocarbon feed conduit 44 couples to pre-reformer 46 and introduces vaporized liquid hydrocarbons from the source exterior to SOFC system 100. Steam recycle conduit 48 also couples to the process side of pre-reformer 46 and introduces a portion of the anode off-gas, which includes steam, from solid oxide fuel cell 34 as a feed. Pre-reformer 46 converts the vaporized hydrocarbon feed and the anode off-gas with steam in the presence of a pre-reformer catalyst into a pre-reformed process gas. The pre-reformed process gas contains carbon dioxide and methane with some carbon monoxide, hydrogen and water.

Pre-reformer product conduit 50 couples sorbent bed 52 to pre-reformer 46 and introduces the pre-reformed process gas into sorbent bed 52. Sorbent bed 52 absorbs the hydrogen sulfide present in the pre-reformed process gas that forms in pre-reformer 46. Sorbent bed 52 forms a desulfurized process gas upon removing the hydrogen sulfide from the pre-reformed process gas.

Sorbent bed product conduit 54 couples to the outlet of sorbent bed 52. Sorbent bed product conduit 54 and PSA off-gas conduit 32 join downstream to form anode feed conduit 56. The desulfurized process gas from sorbent bed 52 and the PSA off-gas from hydrogen PSA 30 mix and form an anode feed gas that contains methane, carbon oxides, hydrogen and water.

Anode feed conduit 56 couples hydrogen PSA 30 and sorbent bed 52 to anode 58 of solid oxide fuel cell 34 and introduces the anode feed gas into anode 58. Anode 58 internally reforms the methane and water contained in the anode feed gas into hydrogen and carbon oxides, forming an anode off-gas.

Compressed air conduit 60 couples to cathode 62 of solid oxide fuel cell 34 and introduces compressed air into cathode 62 from air handling systems exterior to SOFC system 100. In the cathode, solid oxide fuel cell 34 uses electricity to extract oxygen ions from the compressed air in cathode 62, forming an oxygen-deficient air in cathode 62. Cathode deficient air conduit 64 couples to cathode 62 and passes the oxygen-deficient air to air handling systems exterior to SOFC system 100.

Solid oxide fuel cell 34 promotes the electrochemical reactions of extracted oxygen anions with the hydrogen and carbon monoxide present in the anode feed gas in anode 58 to form water and carbon dioxide. The electrochemical reactions free electrons, some of which are useful for continuing the electrochemical reaction by extracting additional oxygen ions on cathode 62. Anode off-gas conduit 66 couples to anode 58 and directs the anode off-gas towards pre-reformer 46 and combustion chamber 16. Anode off-gas contains water vapor and carbon dioxide with traces of hydrogen, methane and carbon monoxide.

Electrical conduit 68 couples to solid oxide fuel cell 34 and directs the excess electricity produced by solid oxide fuel cell 34 to power grid conduit 70 and electrolysis electrical conduit 72. Power grid conduit 70 directs a portion of the electricity to electrical distribution exterior to SOFC system 100 while electrolysis electrical conduit 72 directs electrical current to electrolysis cell 40 for oxygen and hydrogen generation.

Anode off-gas conduit 66 couples the process outlet of anode 58 of solid oxide fuel cell 34 to the process inlet of both pre-reformer 46 and combustion chamber 16 of steam reformer 12. A portion of the anode off-gas is recycled to pre-reformer 46 through steam recycle conduit 48 because of the water content and the heat of the stream. The remaining anode off-gas is directed through reformer feed conduit 74 towards combustion chamber 16 of steam reformer 12.

Electrolysis electrical conduit 72 couples solid oxide fuel cell 34 electrically to electrolysis cell 40. Electrolysis electrical conduit 72 introduces electricity to electrolysis cell 40. Electrolysis water conduit 76 introduces water into electrolysis cell 40 from water handling exterior to SOFC system 100. Electrolysis cell 40 is operable to produce electrolysis hydrogen and electrolysis oxygen from electrically splitting water. Electrolysis hydrogen conduit 38 directs the produced electrolysis hydrogen to hydrogen compression train 8 and electrolysis oxygen conduit 78 directs electrolysis oxygen into combustion chamber 16 of steam reformer 12.

SOFC system 100 uses vaporized liquid hydrocarbons from a source outside of the system to provide hydrocarbons for combusting solid oxide fuel cell 34 off-gases into an EOR-quality carbon dioxide product and to provide heat for catalytic reformation in catalytic reactor tubes 14 of steam reformer 12.

Hydrocarbon feed conduit 82 introduces vaporized liquid hydrocarbons into combustion chamber 16 of steam reformer 12. Combustion chamber 16 is operable to form a flue gas from the combustion of the vaporized liquid hydrocarbons and anode off-gas with the electrolysis oxygen. The flue gas is mostly carbon dioxide with possibly minor amounts of oxygen and water.

Flue gas conduit 84 couples combustion chamber 16 to the process inlet of CO2 purification system 86. Flue gas conduit 84 introduces the flue gas to CO2 purification system 86. CO2 purification system 84 is operable to separate carbon dioxide from the flue gas and convert it into a liquid carbon dioxide product. CO2 purification system 86 also produces as part of the separation process a gas purge and water. CO2 product conduit 88 directs the liquid carbon dioxide product to CO2 product storage exterior to SOFC system 100. Water conduit 90 directs condensed water to water handling exterior to SOFC system 100. Gas purge conduit 92 directs gases from the CO2 purification system points exterior to SOFC system 100.

Hydrocarbon Fuel

The SOFC system is operable to accept a variety of hydrocarbon fuels as both a source of energy as well as a source for reactants available to produce product hydrogen, carbon dioxide and electricity. Examples of useful hydrocarbon fuels for use in the SOFC system include natural gas and its fractions and blends thereof, including hydrogen, methane, ethane, propane, butanes, pentanes, hexanes, liquefied petroleum gas (LPG), liquefied natural gas (LNG), and natural gas liquids (NGL); natural and refined gasoline; associated gas liquid condensate; atmospheric crude oil fractions, including naphtha, especially heavy naphtha, kerosene, and gas oil; diesel fuel; post-refined pure, blended or contaminated petrochemicals, including mixed BTEXs (benzene/toluene/ethylbenzene/xylenes); and liquid vacuum crude oil fractions. Atmospheric crude oil fractions, including naphtha, kerosene and diesel gas oil are useful hydrocarbon fuels because of their relative availability, portability and density. These hydrocarbon fuels also do not require additional cooling or heating to maintain their state of storage and fluid mobility.

The method of using the SOFC system includes introducing hydrocarbon fuel into the SOFC system in a non-liquid state. The method introduces the hydrocarbon fuel as a gas, a vaporized liquid, an atomized liquid as a combination any of the three. Atomization is useful for hydrocarbon liquids having a final boiling point (FBP) greater than 170° C. to avoid coking due to excessive heating to achieve the non-liquid state. Examples of hydrocarbon fuels that may require atomization include heavy naphtha, kerosene, diesel fuel and fuel oils. An embodiment of the method of using the SOFC system includes introduction of the hydrocarbon fuel at a temperature of about 380° C.

An embodiment of method of use includes the introduction of compositionally similar hydrocarbon fuel throughout the SOFC system. In such an embodiment, hydrocarbon fuel is introduced into the hydrodesulfurization system, which feeds the hydrogen production process, the pre-reformer, which feeds the electricity production process, and the reformer combustion chamber, which feeds the carbon dioxide production process. The embodiment of the SOFC system shown in FIG. 1 introduces hydrocarbon fuel from a single hydrocarbon fuel source. An embodiment of the method of using the SOFC system includes introducing a first hydrocarbon fuel to a part of the SOFC system and a second hydrocarbon fuel to a different part of the SOFC system, where the first and second hydrocarbon fuel have different compositions. Such an embodiment provides flexibility in operating the SOFC system to optimize hydrogen, electricity and carbon dioxide production based upon different available hydrocarbon feedstocks, inventory of products, consumer demand and feedstock pricing.

Hydrodesulfurization System

Liquid hydrocarbons, especially atmospheric distilled fractions of crude oil, contain organic sulfur compounds. Examples of heterorganic sulfur compounds include alkane and cycloalkane sulfides, mercaptans, disulfides, polysulfides and thiophenes. Organic and inorganic sulfur compounds poison most reformer and electrochemical catalysts. The SOFC system includes a hydrodesulfurization system that is operable to convert organic sulfur compounds into hydrogen sulfide using hydrogen in the presence of a hydrotreater catalyst. The hydrodesulfurization system is also operable to remove the hydrogen sulfide from the process gas to sweeten it.

The hydrotreater of the hydrodesulfurization system receives hydrogen for the conversion of organic sulfur compounds into hydrogen sulfide. The hydrogen can be purified or blended. The hydrogen can originate from a source inside or outside the SOFC system. An embodiment of the SOFC system includes a hydrogen recycle to the hydrotreater from a downstream part of the SOFC system. Hydrogen-containing streams internal to the SOFC system include the off-gas and the product gas of the hydrogen purification system, the hydrogen gas from the oxygen generation system and the process gas treated by the water-gas shift reactor system. An embodiment of the method of using the SOFC system includes recycling partially compressed product hydrogen from the hydrogen product compressors to the hydrotreater. The hydrogen reacts with the heterorganic compounds in the presence of the hydrotreater catalyst—a molybdenum cobalt catalyst.

The SOFC system includes a sorbent bed operable to remove hydrogen sulfide from the hydrotreated gas. The sorbent bed removes the hydrogen sulfide using a solid metal oxide desiccant, producing a desulfurized hydrocarbon gas. The sorbent bed contains metal oxides that absorb hydrogen sulfide. Examples of useful metal oxides include tin oxides, iron oxides and zinc oxides.

Steam Reformer

The SOFC system includes a steam reformer, which includes catalytic reactor tubes passing through a combustion chamber or furnace. The catalytic reactor side of the reformer is operable to convert hydrocarbons into hydrogen and minor bits of methane and carbon oxides. The furnace side provides the heat for the catalytic reactor side by combusting hydrocarbon and creating carbon dioxide. Heat from the combustion on the furnace side radiates into the catalytic reactor tubes and promotes the cracking reactions. The steam reformer contains multiple catalytic reactor tubes.

Reformer Catalytic Reactor Tubes

In the SOFC system, the catalytic reactor tubes couple to the sorbent bed of the hydrodesulfurization systems and receive desulfurized hydrocarbon gas. The catalytic reactor tubes use steam reforming in the presence of a reforming catalyst to produce a syngas with mostly hydrogen and a little methane. Minor parts of carbon oxides are also present.

The catalytic reactor tubes also receive steam, which provides water for the reformation reactions as well as intrinsic heat since reformation is an endothermic process. The steam can be wet, dry or superheated steam. Superheated steam is useful. An embodiment of the method of using the SOFC system includes introducing superheated steam having a temperature of about 650° C. to the catalytic reactor tubes. An embodiment of the method of using the SOFC system includes introducing steam into the catalytic reactor tubes at a steam-to-carbon molar feed ratio (SCR) is in a range of from about 2:1 to about 4:1. An embodiment of the method of using the SOFC system includes introducing steam into the catalytic reactor tubes at a SCR value of about 3:1. The SCR is the molar amount of steam (as water) for every mole of carbon in the desulfurized liquefied hydrocarbon fed to the catalytic reactor tubes.

To facilitate methanation, the catalytic reactor tubes operate in a lower pressure and temperature range than normal steam reformer conditions. An embodiment of the method of using the SOFC system includes maintaining the temperature in the catalytic reactor tubes in a range of from about 775° C. to about 825° C. An embodiment of the method of using the SOFC system includes maintaining the temperature in the catalytic reactor tubes at about 800° C. An embodiment of the method of using the SOFC system includes maintaining the pressure in the catalytic reactor tubes in a range of from about 8 bars to about 10 bars. An embodiment of the method of using the SOFC system includes maintaining the pressure in the catalytic reactor tubes at about 9.7 bars.

The reforming catalyst in the catalytic reactor tubes has at least one active metal. The active metal reforming catalyst material is preferably comprised of at least one Group 8-10 metal and more preferably is nickel. Nickel is preferred due to activity, low cost and ready availability. Examples of metals useful as active metal reforming catalysts include cobalt, lanthanum, platinum, palladium, iridium, rhodium, osmium, nickel, iron, and ruthenium. The carrier material for the active metal reforming catalyst includes metal oxides and mixed metal oxides (MMO). Examples of suitable carrier materials include a- and y-alumina, magnesium-aluminum oxides, cerium oxides, cerium-zirconium oxides, manganese oxides, lanthanum oxides, niobium oxides, molybdenum oxides, calcium-aluminate, zinc oxides, silicone oxides and titanium oxides. Although not intending to be bound by theory, many metal oxides and mixed metal oxides are strongly suspected of catalytic activity and are therefore operable as co-catalysts in the reformation reactions. The structure of the catalyst carrier preferably resists thermal cycling to prevent the catalyst from being crushed.

The product reformer syngas includes hydrogen, methane, carbon oxides and water. A series of heat exchangers can cool the syngas down to about 300° C. upon passing from the catalytic reactor tubes to recapture heat and support downstream separations.

Reformer Combustion Chamber

In the SOFC system, the reformer combustion chamber couples to the solid oxide fuel cell to receive a portion of the anode off-gas. The reformer combustion chamber also receives vaporized liquid hydrocarbons as a primary fuel. The reformer combustion chamber also couples to an oxygen generation system that provides oxygen as a feed. The main product of the "oxy-combustor" is flue gas containing mostly carbon dioxide and heat. The heat from the combustion transfers into the reformer catalytic reactor tubes to support reformation.

Oxygen is a reactant in the reformer combustion chamber. The SOFC system includes the oxygen generation system that is operable to introduce oxygen into the reformer combustion chamber. An embodiment of the method of using the SOFC system includes introducing oxygen in excess of the stoichiometric amount required to fully combust all of the hydrocarbons and hydrogen introduced into the reformer combustion chamber. An embodiment of the method of using the SOFC system includes introducing at least 10 percent more oxygen than stoichiometrically required for complete thermal combustion of the hydrocarbons and hydrogen introduced into the reformer combustion chamber. Additional oxygen ensures complete combustion of the hydrocarbons and hydrogen into carbon dioxide and water. The introduced oxygen can be blended or pure; however, air or "enriched air" is not preferred to avoid forming NOx.

An embodiment of the method of using the SOFC system includes maintaining the operating temperature of the furnace at about 900° C. An embodiment of the method of using the SOFC system includes maintaining at least a 90° C. temperature differential between the reformer combustion chamber and the catalytic reactor tubes to promote heat transfer.

The product flue gas is almost pure carbon dioxide. A series of heat exchangers can cool the gas passing from the reformer combustion chamber down to about 30° C. to 50° C. to recapture heat. An embodiment of the method of using the SOFC system includes cooling the gas passing from the reformer combustion chamber down to about 38° C.

Water-Gas Shift Reactor System

The SOFC system includes a water-gas shift reactor system that is operable to convert most of the carbon monoxide present in the reformer syngas using water into carbon dioxide and hydrogen in the presence of a water-gas shift catalyst. The reformer syngas has a small amount of carbon monoxide that requires conversion into carbon dioxide. In addition, the water-gas shift reactor system creates product hydrogen. The water-gas shift reactor system produces a shifted syngas product. An embodiment of the method of using the SOFC system includes operating the water-gas shift reactor system such that the overall conversion of carbon monoxide in the reformed syngas into carbon dioxide is about 96%.

The SOFC system uses a dual-stage water-gas shift reactor system: a first stage that is a high temperature shift (HTS) reactor and a second stage that is a low temperature shift (LTS) reactor. The HTS reactor operates to convert some of the carbon monoxide and water in the reformer syngas into carbon dioxide and hydrogen, forming a partially shifted reformer syngas. An embodiment of the SOFC process includes operating the HTS reactor such that it maintains a temperature of about 300° C. An embodiment of the method of using the SOFC system includes operating the HTS reactor such that about 75% of the carbon monoxide introduced with the reformer syngas converts into carbon dioxide. An embodiment of the method of using the SOFC system includes operating the HTS adiabatically.

The HTS reactor passes the partially shifted reformer syngas into the LTS reactor. The LTS reactor also operates to convert some of the carbon monoxide and water in the reformer syngas into carbon dioxide and hydrogen. The product from the LTS reactor is a shifted reformer syngas only a minor amount of carbon monoxide present. An embodiment of the method of using the SOFC system includes cooling the partially shifted reformer syngas to a temperature in a range of from about 200° C. to about 230° C. before introduction into the LTS reactor. An embodiment of the method of using the SOFC system includes cooling the partially shifted reformer syngas to a temperature to about 216° C. An embodiment of the method of using the SOFC system includes operating the LTS reactor such that about 80% of the carbon monoxide introduced with the partially shifted reformer syngas converts into carbon dioxide.

An embodiment of the method of using the SOFC system includes cooling the shifted reformer syngas to a temperature in a range of from about 30° C. to about 50° C.

Hydrogen Purification System

The SOFC system includes a hydrogen purification system that couples to the LTS reactor of the water-gas shift system. The hydrogen purification system is operable to separate hydrogen from the introduced shifted reformer gas, forming a purified hydrogen gas and an off-gas. An embodiment of the method of using the SOFC system includes forming the purified hydrogen gas with a hydrogen purity in a range of from about 99.50 to about 99.99 mole percent. An embodiment of the method of using the SOFC system includes forming the purified hydrogen gas with a hydrogen purity of about 99.99 mole percent. An embodiment of the method of using the SOFC system includes forming a purified hydrogen gas with a pressure in a range of from about 5 to about 10 bars pressure. An embodiment of the method of using the SOFC system includes forming a purified hydrogen gas with a pressure of about 7 bars pressure. An embodiment of the method of using the SOFC system includes forming an off-gas with a pressure in a range of from about 0.4 bars to about 1.0 bars. An embodiment of the method of using the SOFC system includes forming an off-gas with a pressure of about 0.4 bars. The hydrogen purification system off-gas includes carbon monoxide, carbon dioxide, methane, water and hydrogen.

The hydrogen purification system can separate the shifted reformer syngas using a number of technologies well known in the chemical processing industry, including cryogenic liquidification, wet scrubbing (for example, Benfield process) with post-scrubbing methanation, selective membrane separation and pressure-swing-absorption (PSA) systems. An embodiment of the SOFC system includes a PSA that is operable to purify hydrogen. The hydrogen purification system passes purified hydrogen to the hydrogen compressor system. The hydrogen purification system directs the off-gas to the solid oxide fuel cell for electricity production.

Hydrogen Compression and Storage System

The SOFC system includes a hydrogen compressor and storage system. The hydrogen compressor and storage system couples to the hydrogen purification system, receives purified hydrogen and is operable to compress and store the product hydrogen as a compressed hydrogen product suitable for end-use, including transport, long-term storage at low temperatures and for fueling HFCVs.

In the SOFC process, the hydrogen compression and storage system uses a first compression system to pressurize the purified hydrogen to about 170 bars for bulk hydrogen storage. Using a second compressor system, the hydrogen compression and storage system pressurizes the purified hydrogen to about 430 bars for cascade storage. At cascade storage pressure, the compressed hydrogen product is useful for dispensing in a retail manner to HFCVs. Dispensing pressures are in a range from slightly lower (about 350 bars) to significantly higher (about 700 bars) than cascade storage pressure given the needs of the hydrogen-dispensing retail market. The various compression technologies useful for pressurizing hydrogen to these service and storage pressures are known to those of skill in the art and include single and multi-stage compressors, intercoolers and mist eliminators.

An embodiment of the SOFC system includes the hydrogen compression and storage system coupling to and operable to pass a portion of compressed hydrogen product to the hydrotreatment system. An embodiment of the method of using the SOFC system includes passing compressed hydrogen product to the hydrotreatment system at a pressure of about the bulk hydrogen storage pressure.

An embodiment of the SOFC system includes the hydrogen compression and storage system coupling to the oxygen generation system. In such an embodiment, the hydrogen compressor system is operable to receive purified hydrogen passing from the oxygen generation system. The hydrogen compressor system acts to mix and pressurize the purified hydrogen from the oxygen generation system along with the purified hydrogen from the reformer into the compressed hydrogen product.

Pre-Reformer

The SOFC system includes a pre-reformer. The pre-reformer is operable to convert non-methane hydrocarbons in an introduced feed into a methane-rich effluent. The methane-rich effluent is useful for a downstream SOFC to internally reform and then electrochemically convert into carbon oxides, which generates electricity.

In the SOFC system the pre-reformer receives vaporized liquid hydrocarbons. An embodiment of the SOFC process includes introducing vaporized liquid hydrocarbons composition into the pre-reformer having the same liquid hydrocarbons composition as those introduced into the hydrodesulfurization system. The pre-reformer is operable to convert the non-methane hydrocarbons introduced with the vaporized liquid hydrocarbons using water vapor and in the presence of a pre-reformer catalyst into a pre-reformer syngas product containing methane and carbon oxides.

In the SOFC system, the pre-reformer couples to the anode outlet of the SOFC. The pre-reformer is operable to receive a portion of the solid oxide fuel cell anode off-gas as an anode exhaust recycle stream. The anode off-gas includes significant portions of carbon dioxide and water vapor as well as some amounts of methane, hydrogen and carbon monoxide. An embodiment of the method of using the SOFC system includes introducing the anode exhaust recycle to the pre-reformer such that a steam-to-carbon molar ratio is in a range of from about 3:1 to about 4:1. An embodiment of the method of using the SOFC system includes introducing the anode exhaust recycle to the pre-reformer such that a steam-to-carbon molar ratio is at a ratio of 3.5:1. The "steam" is molar water (in vapor form) in the SOFC anode off-gas. The "fresh carbon" is the molar carbon in the introduced vaporized liquid hydrocarbons. Because the SOFC anode off-gas includes a significant amount of water vapor that is already heated, the pre-reformer of the SOFC system can operate such that "fresh" or "make-up" steam is not required as a feed. An embodiment of the method of using the SOFC system introduces steam to the pre-reformer such that the steam-to-carbon molar ratio is in a range of from about 3:1 to about 4:1.

An embodiment of the method of using the SOFC system includes operating the pre-reformer adiabatically. An embodiment of the method of using the SOFC system includes operating the pre-reformer at a temperature in a range of from about 350° C. to about 400° C. An embodiment of the method of using the SOFC system includes operating the pre-reformer at a pressure in a range of about 9 bars.

The reforming process that occurs in the pre-reformer occurs in the presence of a pre-reforming catalyst. An embodiment of the SOFC system includes a pre-reformer containing a precious active metal catalyst that is sulfur-tolerant. Precious metals include platinum, palladium, iridium, rhodium, ruthenium, silver and gold. The pre-reforming catalyst can also include materials that improve their selectivity and reforming activity, including samaria-doped ceria (SDC), gadolinia-doped ceria and yttria-doped ceria. In the presence of the pre-reforming catalyst, heterorganic compounds, including previously discussed organic sulfur compounds, convert into alkanes and hydrogen sulfide. The alkanes further convert into methane and carbon oxides before egressing from the pre-reformer as part of the pre-reformer syngas product.

The pre-reformer syngas product is a mixture of methane and carbon oxides for use in the SOFC for electricity production. An embodiment of the method of using the SOFC system includes operating the pre-reformer such that it produces the pre-reformer syngas product having methane in a range of from about 15 percent to about 20 percent on a dry mole basis. An embodiment of the method of using the SOFC system includes operating the pre-reformer such that it produces the pre-reformer syngas product having methane of about 17 percent on a dry mole basis. The remainder of the pre-reformer syngas product is predominantly hydrogen and carbon oxides.

Pre-SOFC Sorbent Bed

The SOFC system includes a sorbent bed that is operable to remove hydrogen sulfide from the pre-reformer syngas product. Removing the hydrogen sulfide from the pre-reformer syngas product protects the ceramic electrolyte and the reforming catalyst in the solid oxide fuel cell. The sorbent bed couples to the outlet of the pre-reformer and receives the pre-reformer syngas. The sorbent bed contains metal oxides that absorb hydrogen sulfide. Example metal oxides include tin oxides, iron oxides and zinc oxides. The sorbent bed produces a desulfurized pre-reformer syngas.

Solid Oxide Fuel Cell

The SOFC system includes a solid oxide fuel cell having a ceramic electrolyte that couples the anode and the cathode sides. The anode side of the SOFC is operable to internally reform methane and water in the presence of a reforming catalyst into carbon monoxide and hydrogen, and then electrochemically convert the formed syngas with oxygen anions into carbon dioxide and water, producing free electrons. The cathode side is operable to use free electrons to convert oxygen into oxygen anions. The oxygen ions transport through the ceramic, ion-conducting electrolyte from the cathode side to the anode side and react with the syngas on the electrolyte surface. Excess electrical power produced by the solid oxide fuel cell is a product of the SOFC process.

In SOFC systems, the anode of the solid oxide fuel cell couples to both the off-gas side of the hydrogen purification system and the outlet of the sorbent bed that couples to the pre-reformer. The two outlet streams combine and form an anode feed stream that contains methane, hydrogen, carbon oxides and water. An embodiment of the method of using the SOFC system includes pre-heating the anode feed stream to about 600° C. before introduction into the anode. An embodiment of the method of using the SOFC system includes pre-heating the anode feed stream with the solid oxide fuel cell anode off-gas.

Maximizing the methane composition and minimizing the amount of non-methane alkanes and hydrogen in the anode feed stream increases the internal reforming capacity of the solid oxide fuel cell and improves electricity generation. Internal reformation occurs in the presence of a reforming catalyst in the solid oxide fuel cell. Internal reformation lowers the amount of compressed air used on the cathode side to cool the ceramic electrolyte of the solid oxide fuel cell as the endothermic reformation reaction cools the exothermic electrochemical conversion of syngas into off-gas. An embodiment of the method of using the SOFC system includes operating the anode side of the solid oxide fuel cell at a temperature in a range of from about 500° C. to about 1000° C. An embodiment of the method of using the SOFC system includes operating the anode side of the solid oxide fuel cell at a temperature in a range of from about 725° C. to about 775° C. An embodiment of the method of using the SOFC system includes operating the anode side of the solid oxide fuel cell at a temperature in a range of about 750° C.

In SOFC systems, the anode couples to both the pre-reformer inlet and the reformer combustion chamber. The product anode off-gas is rich in carbon dioxide and water but also has some hydrogen, carbon monoxide, water and methane. An embodiment of the method of using the SOFC system includes cooling a portion of the anode off-gas to a temperature of less than 150° C. and compressing it to a pressure of about 1.2 bars. An embodiment of the method of using the SOFC system includes cooling a portion of the anode off-gas to a temperature of about 93° C. Cooled, pressurized anode off-gas is useful as a feed for the pre-reformer for its water, hydrogen and methane content.

The cathode side of the solid oxide fuel cell receives air driven by an air blower to supply oxygen necessary for the electrochemical conversion of the syngas on the anode side and to cool the ceramic electrolyte. An embodiment of the method of using the SOFC system includes introducing the feed air into the cathode side of the solid oxide fuel cell at a pressure of about 0.7 bars. Pre-heating the feed air improves oxygen reduction into oxygen anions. An embodiment of the SOFC process includes preheating the feed air to a temperature of about 600° C. before introduction into the cathode. An embodiment of the method of using the SOFC system includes pre-heating the feed air with the oxygen-depleted cathode side discharge.

The solid oxide fuel cell produces power in excess of SOFC process consumption requirements. The solid oxide fuel cell system directs excess electrical power, that is, electricity not used by the solid oxide fuel cell or other internal SOFC system users, to external distribution systems. An embodiment of the SOFC system includes where the solid oxide fuel cell electrically couples to the oxygen generation system and is operable to pass an electrical current to the oxygen generation system. In such an embodiment, the electrical output from the solid oxide fuel cell supports the oxygen-generation process in the oxygen generation system. External distribution systems include retail distribution systems operable to provide electricity to EVs.

Oxygen Generation System

The SOFC system includes an oxygen generation system. The oxygen generation system is operable to produce and then introduce oxygen into the SOFC system. The oxygen generation system can use a number of technologies well known in the chemical processing industry to form and distribute oxygen, including electrolysis cell, cryogenic air separation, oxygen-selective transport membrane separation, vacuum PSA (VPSA) unit separation and ozone generator technologies.

The oxygen generation system in the SOFC system couples to the reformer combustion chamber and passes oxygen into the reformer combustion chamber as a feed. The oxygen can enter as a pure feed or as a blend. An embodiment of the method of using the SOFC system includes operating the oxygen generation system such that it produces oxygen with a purity of at least 80 percent oxygen on a dry molar basis. An embodiment of the method of using the SOFC system includes operating the oxygen generation system such that it produces oxygen with a purity of at least 90 percent oxygen on a dry molar basis. An embodiment of the method of using the SOFC system includes operating the oxygen generation system such that it produces oxygen with a purity of at least 95 percent oxygen on a dry molar basis.

An embodiment of the SOFC system includes an electrolysis cell as the oxygen generating system that is operable for producing electrolysis oxygen and electrolysis hydrogen using water. In such an embodiment, the electrolysis cell is operable to use electricity to decompose water into separate oxygen and hydrogen products. An example of such an electrolysis cell is a proton electrolyte membrane (PEM) electrolysis cell, which is capable of generating highly pure hydrogen (99.99 mole percent) and oxygen. In such an embodiment of the SOFC system, the oxygen generating system couples to both the reformer combustion chamber and the hydrogen compression system, where the electrolysis oxygen passes to the reformer combustion chamber and the electrolysis hydrogen passes to the hydrogen compressor system. The electrolysis hydrogen may require pre-compression to elevate its pressure before introduction to the hydrogen compressor system.

The oxygen generation system can use electrical power to convert feeds into oxygen for use in the SOFC system. An embodiment of the SOFC system includes electrically coupling the solid oxide fuel cell to the oxygen generation system such that electricity from the solid oxide fuel cell fosters the oxygen-generation reaction in the oxygen generation system.

An embodiment of the method of using the SOFC system includes maintaining the temperature of the oxygen generation system at a temperature of about 50° C. during oxygen generation.

CO2 Purification and Liquidification System

The SOFC system includes a CO2 purification and liquidification system. The CO2 purification and liquidification system is operable to receive the cooled flue gas from the reformer combustion chamber and separately extract water and oxygen from the cooled flue gas, forming a refined carbon dioxide gas. An embodiment of the method of using the SOFC system includes forming a refined carbon dioxide with an oxygen concentration of less than 10 parts-per-million (ppm) molar.

The CO2 purification and liquidification system is also operable to refrigerate and compress the refined carbon dioxide gas to form a liquid carbon dioxide product. An embodiment of the method of using the SOFC system includes forming a liquid carbon dioxide product with a temperature in a range of from about −20° C. to about −50° C. and a pressure of about 22 bars. Suitable compression and refrigeration technology for liquefying refined carbon dioxide includes propane chillers.

The SOFC process and system are very efficient in containing and recovering produced carbon dioxide for use in chemical production, EOR processes or sequestration. An embodiment of the method of using the SOFC system includes operating the system such that over 90 percent of all the carbon dioxide produced in the SOFC system is captured and converted into the liquid carbon dioxide product. The SOFC process purges the remaining carbon dioxide and inerts.

Alternative Fueling Station for HFCVs and EVs

The alternative fueling station uses a SOFC system as previously described to generate a supply of compressed hydrogen and direct electrical current, which are alternative fuels. The alternative fueling station is operable to distribute compressed hydrogen and direct electrical current to fuel alternative fuel vehicles, including hydrogen fuel cell vehicles (HFCVs) and electric vehicles (EVs). The alternative fueling station includes at least one conduit operable to couple to and convey compressed hydrogen into a HFCV to fuel it. The alternative fueling station also includes at least one conduit operable to couple to and convey electrical power into an EV to charge it. The alternative fueling station is operable to fuel both HFCVs and EVs simultaneously.

The method of using the alternative fueling station to refuel an alternative fuel vehicle with alternative fuels includes the steps of introducing hydrocarbon fuel into the SOFC system and operating the SOFC system to produce the alternative fuels. An embodiment of the method includes producing compressed hydrogen having a pressure in a range of from about 350 bars to about 700 bars and having a hydrogen mole purity of 99.99 percent. An embodiment of the method includes producing electricity having a direct current. An alternative fuel vehicle includes a HFCV having a hydrogen fuel tank as an alternative fuel storage device. An alternative fuel vehicle includes an EV with a battery bank as an alternative fuel storage device. The method also includes the step of coupling the alternative fuel vehicle to the SOFC system such that a conduit forms between the SOFC system and the alternative fuel storage device. The method also includes the step of introducing an amount of alternative fuel to the alternative fuel vehicle such that the amount introduced does not exceed the capacity of the alternative fuel storage device. The method also includes the step of decoupling the alternative fuel vehicle from the SOFC system.

During periods of non-use of the retail refueling station, the SOFC process continues to draw hydrocarbon fuel and manufacture hydrogen for long-term storage and electricity for distribution either into a coupled electrical grid or a spot-demand electricity storage systems, including traditional banks of capacitors/batteries or alternative storage means (for example, gas compression/decompression with electrically-coupled generators and turbines). Transmission of electricity into a coupled electrical grid may require conversion of the electrical current from direct current into alternating current (AC). The continuous production of hydrogen and electricity permits steady state operation of the SOFC system, which enhances reliability, troubleshooting and permits the SOFC system to handle sudden changes in production or demand levels over a process that is more "on/off" in operation.

Supporting Equipment

Embodiments include many additional standard components or equipment that enables and makes operable the described apparatus, process, method and system. Examples of such standard equipment known to one of ordinary skill in the art includes heat exchanges, pumps, blowers, reboilers, steam generation, condensate handling, membranes, single and multi-stage compressors, separation and fractionation equipment, valves, switches, controllers and pressure-, temperature-, level- and flow-sensing devices.

Operation, control and performance of portions of or entire steps of a process or method can occur through human interaction, pre-programmed computer control and response systems, or combinations thereof.

Examples of specific embodiments facilitate a better understanding of solid oxide fuel cell system and process. In no way should the Example limit or define the scope of the invention.

EXAMPLE

The embodiment of the SOFC system shown in FIG. 1 is configured in AspenPlus® (Aspen Technology, Inc.; Burlington, Mass.), a chemical process simulator, runs two different types of vaporized liquid hydrocarbon feed stocks: naphtha and kerosene. Process simulation using the SOFC system shown in FIG. 1 produces 250 Nm3/hr of hydrogen suitable for use in HFCVs (+99.99 molar percent purity) as well as provide at least 370 kW of electrical power for EVs. Table 1 gives the results of the simulations.

TABLE 1

FIG. 1 simulation results for naphtha and kerosene hydrocarbon fuel.
FIG. 1 Co-production Study

|  | Units | Naphtha | Kerosene |
|---|---|---|---|
| Fuel Balance | | | |
| Total Fuel Introduced | kg/hr | 218.6 | 218.8 |
| Total Fuel Introduced (HHV) | GJ/hr | 10 | 10.1 |
| H2 Balance | | | |
| Gross Generation Consumption: | Nm3/hr | 265 | 264 |
| To Desulfurizer | Nm3/hr | 2 | 2 |
| To Reformer Furnace | Nm3/hr | 13 | 13 |
| Total H2 Internal Consumption | Nm3/hr | 15 | 14 |
| Net H2 for Export | Nm3/hr | 250 | 250 |
| CO2 Captured | kg/hr | 619.9 | 620.5 |
| Power Balance | | | |
| Gross Generation | kW | 1272 | 1270 |
| Total Auxiliary Power Consumption | kW | 902 | 899 |
| Net Export Power | kW | 370 | 371 |
| Overall Efficiency | % HHV | 45.3 | 44.7 |

The results of Table 1 show a High Heating Value (HHV) efficiency that reflects a significant advantage over traditional hydrogen carrier-based refueling stations, which have efficiencies in the 23-25% HHV range. The co-production of electricity by the solid oxide fuel cell as well as internally reforming methane in the solid oxide fuel cell provides significant energy savings reflected in the overall efficiency value.

What is claimed is:

1. A solid oxide fuel cell (SOFC) system comprising:
a steam reformer, the steam reformer comprising:
catalytic reactor tubes, where the catalytic reactor tubes are operable to receive steam and a hydrocarbon feed and are operable to convert hydrocarbons of the hydrocarbon feed into hydrogen to produce a reformer syngas, the reformer syngas comprising hydrogen; and
a combustion chamber, where the combustion chamber is thermally coupled to the catalytic reactor tubes, is operable to receive the hydrocarbon feed, an oxygen feed, and an anode exhaust gas, and is operable to produce a flue gas, the flue gas comprising carbon dioxide;
a hydrogen purification system, where the hydrogen purification system is operable to receive the reformer syngas and is operable to produce a purified hydrogen gas and an off-gas stream, the off-gas stream comprising methane;
a pre-reformer, where the pre-reformer is operable to receive the hydrocarbon feed and the anode exhaust gas and is operable to produce a pre-reformer syngas, the pre-reformer syngas comprising methane; and
a solid oxide fuel cell, where the solid oxide fuel cell is operable to electrochemically convert methane and water into hydrogen and carbon oxides to produce electrical power and where the solid oxide fuel cell comprises an anode side,
where the anode side is operable to produce the anode exhaust gas, the anode exhaust gas comprising hydrogen and carbon oxides, and comprises an anode side inlet,
where the anode side inlet is fluidly coupled to the hydrogen purification system and the pre-reformer and is operable to receive an anode feed, the anode feed comprising a mixture of the off-gas stream and the pre-reformer syngas.

2. The SOFC system of claim 1, further comprising:
an oxygen generation system, the oxygen generation system comprising an electrolysis cell,
where the electrolysis cell is operable to receive water, is electrically coupled to the solid oxide fuel cell to receive electrical power, is operable to convert water into hydrogen and oxygen to produce an electrolysis hydrogen and an electrolysis oxygen, and is fluidly coupled to the combustion chamber such that the oxygen feed comprises the electrolysis oxygen.

3. The SOFC system of claim 2, further comprising:
a hydrogen compression train, where the hydrogen compression train is operable to receive the purified hydrogen gas and the electrolysis hydrogen and is operable to produce a hydrogen recycle feed and a compressed hydrogen product.

4. The SOFC system of claim 3, further comprising:
a hydrodesulfurization system, the hydrodesulfurization system comprising:
a hydrotreater, where the hydrotreater is fluidly coupled to the hydrogen compression train, is operable to receive the hydrocarbon feed and the hydrogen recycle feed, and is operable to convert organic sulfur compounds in the hydrocarbon feed into hydrogen sulfide to produce a hydrotreated gas; and a first sorbent bed, where the first sorbent bed is fluidly coupled to the hydrotreater and the steam reformer, is operable to receive the hydrotreated gas, and is operable to absorb hydrogen sulfide of the hydrotreated gas.

5. The SOFC system of claim 1, further comprising:
a water-gas shift reactor system, where the water-gas shift reactor system is fluidly coupled to the catalytic reactor tubes and the hydrogen purification system, is operable to receive the reformer syngas, and is operable to convert carbon monoxide and water into carbon dioxide and hydrogen.

6. The SOFC system of claim 1, where the pre-reformer is followed by a second sorbent bed, where the second sorbent bed is operable to receive the pre-reformer syngas and is operable to absorb hydrogen sulfide of the pre-reformer syngas.

7. The SOFC system of claim 1, where the hydrogen purification system comprises a pressure-swing-adsorption unit.

8. The SOFC system of claim 1, where the pre-reformer is configured to operate adiabatically.

9. The SOFC system of claim 1, further comprising:
a carbon dioxide purification system, where the carbon dioxide purification system is fluidly coupled to the combustion chamber, is operable to receive the flue gas, and is operable to produce a refined carbon dioxide product.

10. The SOFC system of claim 1, where the solid oxide fuel cell further comprises a cathode side,
where the cathode side is operable to receive an air feed, the air feed comprising oxygen, and is operable to produce oxygen ions and an oxygen-deficient air.

11. The SOFC system of claim 2, where the electrolysis cell comprises a proton exchange membrane.

12. A method of producing hydrogen, carbon dioxide, and electrical power utilizing a solid oxide fuel cell (SOFC) system comprising the steps of:
introducing a hydrocarbon feed and steam to a steam reformer, the steam reformer comprising:
catalytic reactor tubes, where the catalytic reactor tubes are operable to receive steam and the hydrocarbon feed and are operable to convert hydrocarbons of the hydrocarbon feed into hydrogen to produce a reformer syngas, the reformer syngas comprising hydrogen; and
a combustion chamber, where the combustion chamber is thermally coupled to the catalytic reactor tubes, is operable to receive the hydrocarbon feed, an oxygen feed, and an anode exhaust gas, and is operable to produce a flue gas, the flue gas comprising carbon dioxide;
introducing the oxygen feed to the combustion chamber;
introducing the anode exhaust gas to the combustion chamber;
introducing the reformer syngas to a hydrogen purification system, where the hydrogen purification system is operable to produce a purified hydrogen gas and an off-gas stream, the off-gas stream comprising methane;
introducing the hydrocarbon feed to a pre-reformer, where the pre-reformer is operable to receive the anode exhaust gas and is operable to produce a pre-reformer syngas, the pre-reformer syngas comprising methane;
introducing the anode exhaust gas to the pre-reformer; and
introducing an anode feed to a solid oxide fuel cell, the anode feed comprising a mixture of the off-gas stream and the pre-reformer syngas, where the solid oxide fuel cell is operable to electrochemically convert methane and water into hydrogen and carbon oxides to produce electrical power and comprises an anode side,
where the anode side is operable to produce the anode exhaust gas, the anode exhaust gas comprising hydrogen and carbon oxides, and comprises an anode side inlet,
where the anode side inlet is fluidly coupled to the hydrogen purification system and the pre-reformer and is operable to receive the anode feed.

13. The method of claim 12, further comprising the step of:
introducing water and electrical power to an oxygen generation system, the oxygen generation system comprising an electrolysis cell,
where the electrolysis cell is operable to receive water, is electrically coupled to the solid oxide fuel cell to receive electrical power, is operable to convert water into hydrogen and oxygen to produce an electrolysis hydrogen and an electrolysis oxygen, and is fluidly coupled to the combustion chamber such that the oxygen feed comprises the electrolysis oxygen.

14. The method of claim 13, further comprising the step of:
introducing the purified hydrogen gas and the electrolysis hydrogen to a hydrogen compression train, where the hydrogen compression train is operable to produce a hydrogen recycle feed and a compressed hydrogen product.

15. The method of claim 14, further comprising the step of:
introducing the hydrocarbon feed and the hydrogen recycle feed to a hydrodesulfurization system, the hydrodesulfurization system comprising:
a hydrotreater, where the hydrotreater is fluidly coupled to the steam reformer and the hydrogen compression train, is operable to receive the hydrocarbon feed and the hydrogen recycle feed, and is operable to convert organic sulfur compounds in the hydrocarbon feed into hydrogen sulfide to produce a hydrotreated gas; and
a first sorbent bed, where the first sorbent bed is fluidly coupled to the hydrotreater and the steam reformer, is operable to receive the hydrotreated gas, and is operable to absorb hydrogen sulfide of the hydrotreated gas.

16. The method of claim 12, where the step of introducing the reformer syngas to a hydrogen purification system further comprises a water-gas shift reactor system,
where the water-gas shift reactor system is fluidly coupled to the catalytic reactor tubes and the hydrogen purification system, is operable to receive the reformer syngas, and is operable to convert carbon monoxide and water into carbon dioxide and hydrogen.

17. The method of claim 12, where the step of introducing the hydrocarbon feed to a pre-reformer further comprises a second sorbent bed, where the second sorbent bed is fluidly coupled to the pre-reformer and the anode side, is operable to receive the pre-reformer syngas, and is operable to absorb hydrogen sulfide of the pre-reformer syngas.

18. The method of claim 12, where the hydrogen purification system comprises a pressure-swing-adsorption unit.

19. The method of claim 12, where the pre-reformer is configured to operate adiabatically.

20. The method of claim 12, further comprising the step of:

introducing the flue gas to a carbon dioxide purification system, where the carbon dioxide purification system is fluidly coupled to the combustion chamber and is operable to produce a refined carbon dioxide product.

21. The method of claim 12, further comprising the step of:
introducing an air feed to a cathode side of the solid oxide fuel cell, the air feed comprising oxygen,
where the cathode side is operable to produce oxygen ions and an oxygen-deficient air.

22. The method of claim 13, where the electrolysis cell comprises a proton exchange membrane.

* * * * *